United States Patent [19]

Vogt et al.

[11] Patent Number: 4,567,692
[45] Date of Patent: Feb. 4, 1986

[54] SEALING ARRANGEMENT FOR A VEHICLE

[75] Inventors: Hans Vogt, Overath; Herbert Kloppe, Pulheim, both of Fed. Rep. of Germany

[73] Assignee: Ford Motor Company, Dearborn, Mich.

[21] Appl. No.: 593,166

[22] Filed: Mar. 26, 1984

[30] Foreign Application Priority Data

Apr. 14, 1983 [DE] Fed. Rep. of Germany ....... 3313545

[51] Int. Cl.⁴ .............................................. E06B 7/16
[52] U.S. Cl. ...................................... 49/477; 296/216; 296/218; 296/223
[58] Field of Search ................... 49/477; 296/216, 218, 296/223, 224

[56] References Cited

U.S. PATENT DOCUMENTS

| 2,088,909 | 8/1934 | Jaubert | 20/69 |
| 2,361,298 | 10/1944 | Laddon | 244/121 |
| 3,100,918 | 8/1963 | Coverley | 20/19 |
| 3,580,629 | 5/1971 | Heim | 49/477 X |
| 3,747,275 | 7/1973 | May et al. | 49/477 |
| 3,968,597 | 7/1976 | Hirtle | 49/477 |
| 4,250,941 | 2/1981 | McNally | 160/209 |
| 4,312,534 | 1/1982 | Jardin et al. | 296/216 |

Primary Examiner—Philip C. Kannan
Attorney, Agent, or Firm—Clifford L. Sadler; Daniel M. Stock

[57] ABSTRACT

A sealing arrangement for an automotive body closure such as a sliding roof comprises a sealing member including a tubular sealing portion and a shorter reservoir portion. The two portions are filled with hydraulic fluid and communicate with one another. When the closure member is closed, the sealing portion is not under pressure and offers little resistance to the movement of the closure member. After closing, an actuator such as a crank is retracted and in so doing acts through a rack and pinion on an actuating device which compresses the reservoir portion and thus pressurizes the sealing member to improve the sealing of the joint.

4 Claims, 3 Drawing Figures

SEALING ARRANGEMENT FOR A VEHICLE

BACKGROUND OF THE INVENTION

The invention relates to a sealing arrangement for a joint between an opening in a bodywork of a vehicle and a closure member received in the opening. The closure member may be, for example, a siding roof panel or a door.

It has already been proposed to employ a sealing arrangement in which the pressure in the interior of a generally tubular sealing member, which seals the joint, is increased to effect a tighter seal.

German Pat. No. 1 430 936 discloses an arrangement for sealing the door of vehicles in which a tubular sealing member has an inner cavity acted upon by pressure or vacuum as a function of the state of travel. Although this allows the door to be opened easily when the vehicle is standing still and ensures a reliable seal when the vehicle is travelling, the pressure or vaccum sources—in the form of compressors or vacuum accumulators—required for this represent a considerable expense.

German Laid Open Specification No. 30 46 459 discloses a sealing strip for an opening in a vehicle bodywork which may be closed by means of a closure member such as a window pane or a door. The sealing strip comprises a resilient hollow body which is partially compressed when the closure member is closed, and the air pressure in the hollow body is increased as a function of the aerodynamic pressure which has built up through the travelling velocity. The expenditure required for this is considerably less, but it is doubtful whether an adequate increase in pressure can be produced in the hollow body of the sealing strip with the narrow duct cross-section connected to it.

Germain Laid Open Specification No. 20 22 682 describes a seal for a joint in a vehicle body which comprises a tubular sealing portion and an actuating portion which subjects the sealing portion to increased pressure as the movable part of the bodywork is closed. In this arrangement, the additional pressure is produced in the interior of the actuating portion by subjecting a substantial part of the seal to pressure mechanically, as a result of which an increased force is required for closing the closure member.

The present invention seeks to provide a sealing arrangement which may be manufactured inexpensively and in which it is possible to close the closure member without increased resistance.

SUMMARY OF THE INVENTION

According to the present invention, there is provided a sealing arrangement for a joint between an opening in the bodywork of a vehicle and a closure member for the opening, the closure member having an operating lever movable into a locking position after the closure member is closed, the sealing arrangement comprising a sealing member having a generally tubular sealing portion and a shorter tubular fluid reservoir portion contiguous with the sealing portion and in fluid communication therewith, both portions being filled with a pressure medium, and means operative in response to movement of the operating lever into the locking position after closing the closure member to compress the reservoir portion and thereby increase the pressure within the tubular sealing portion.

The invention takes advantage of the fact that the operating lever of the closure member, for example the cranking handle of a sliding roof or the handle of a door, is movable into a locking position after the closure member is closed. For example, the cranking handle of a sliding roof is retracted into a recess in the roof after the roof panel has been closed. This locking movement is employed to compress the tubular fluid reservoir portion to increase the sealing pressure in the sealing portion. Thus, no increased resistance is met while closing the door and the additional pressure required to improve the seal is effected by the locking action of the operating lever.

In a sealing arrangement according to the invention for a crank-operated sliding roof, the seal may be received on a flange of the sliding roof panel and the means for compressing the reservoir portion may comprise a pressure plate arranged on the end face of the opening in the bodywork.

Preferably, the cranking arm for the sliding roof panel may be connected to the pressure plate by way of a rack and pinion connection, the cranking arm being formed with a pinion which engages the rack during its movement into a retracted position, the rack being in turn connected to the pressure plate.

It is possible also to apply the teaching of the invention to the doors or the tailgate of a motor vehicle. For example, the pivoting movement of a door handle performed after the door or the tailgate is closed may be used to compress the reservoir portion of the sealing member.

Futhermore, it is possible, for example by forming a turning catch in a second locking position of the handle, for a stored spring force to be released which acts to compress the fluid in the sealing member. It is further possible to use a centrally controlled locking system of an electromechanical type, which is now being increasingly used in more comfortable vehicle models for operating the actuating element.

BRIEF DESCRIPTION OF THE DRAWINGS

The invention will now be described further, by way of example, with reference to the accompanying drawings, in which.

DESCRIPTION OF A PREFERRED EMBODIMENT

Figure 1:
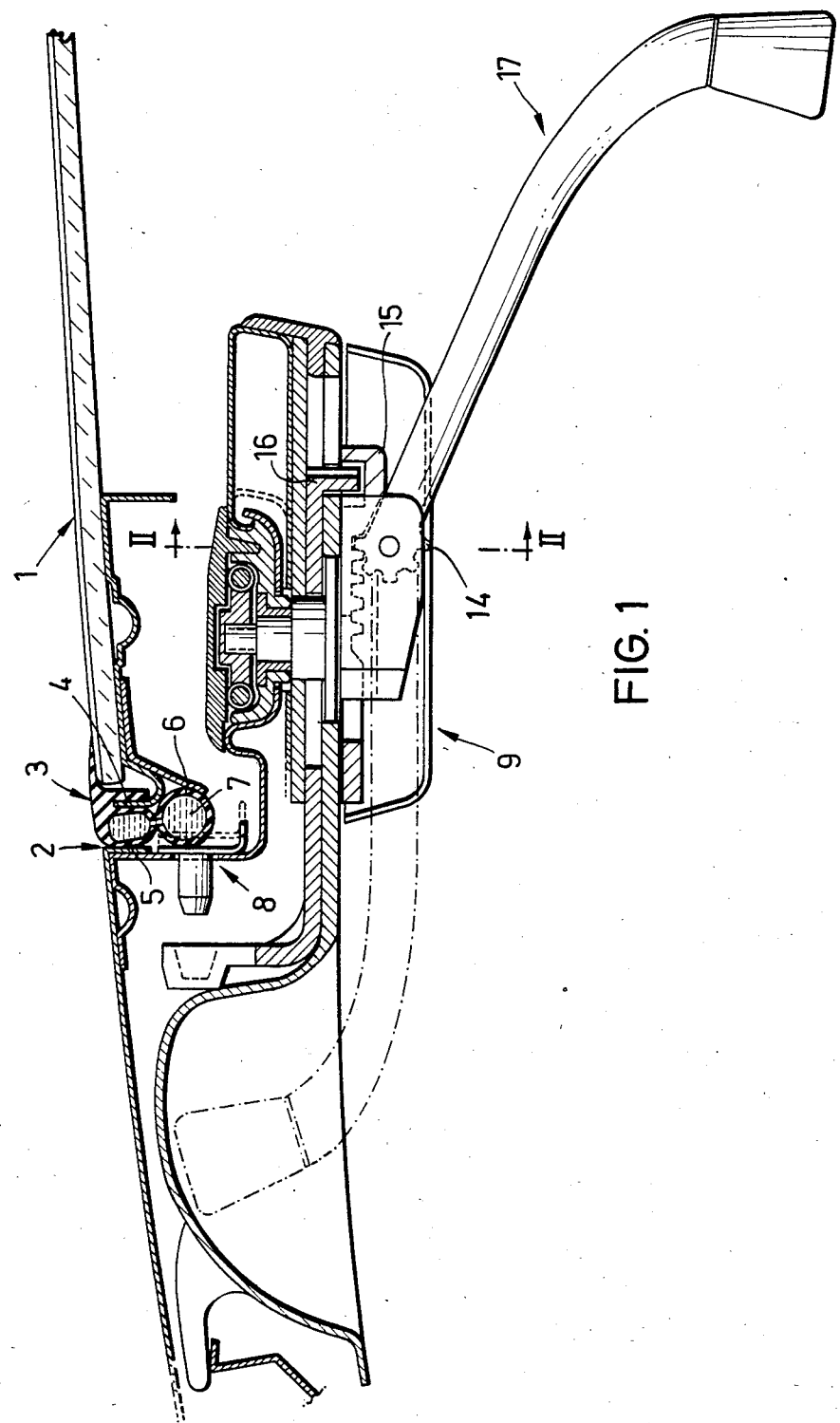
FIG. 1 is a vertical section through a crank-operated sliding roof panel with a sealing arrangement according to the invention.
Figure 2:
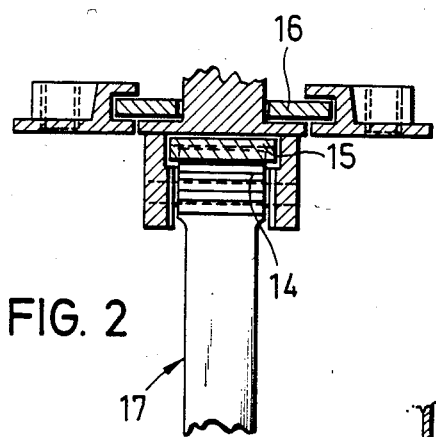
FIG. 2 is a section along the line II-II in FIG. 1.

The sealing arrangement illustrated in FIG. 1 is provided for sealing the joint between a sliding roof panel 1 and a roof opening 2 of a motor vehicle having a crank-operated sliding roof.

The sealing arrangement comprises a sealing member 3 which is secured to a continuous flange 4 of the sliding roof panel 1 in a known manner. The sealing member 3 consists of a continuous tubular sealing portion 5 and a tubular reservoir portion 6 extending over only part of the periphery of the sealing portion 5. The volume within the tubular reservoir portion 6 is hydraulically connected to the cavity of the sealing portion 5, and both cavities are filled with a hydraulic pressure medium 7, such as glycerin.

An acutating device 8 is disposed on the end face of the roof opening 2 adjacent the reservoir portion 6 and is acted upon by an operating lever or cranking handle 9 when the latter is moved into a locking position after the roof panel 1 is closed. This acts to compress the fluid in the reservoir portion 6.

Figure 3:
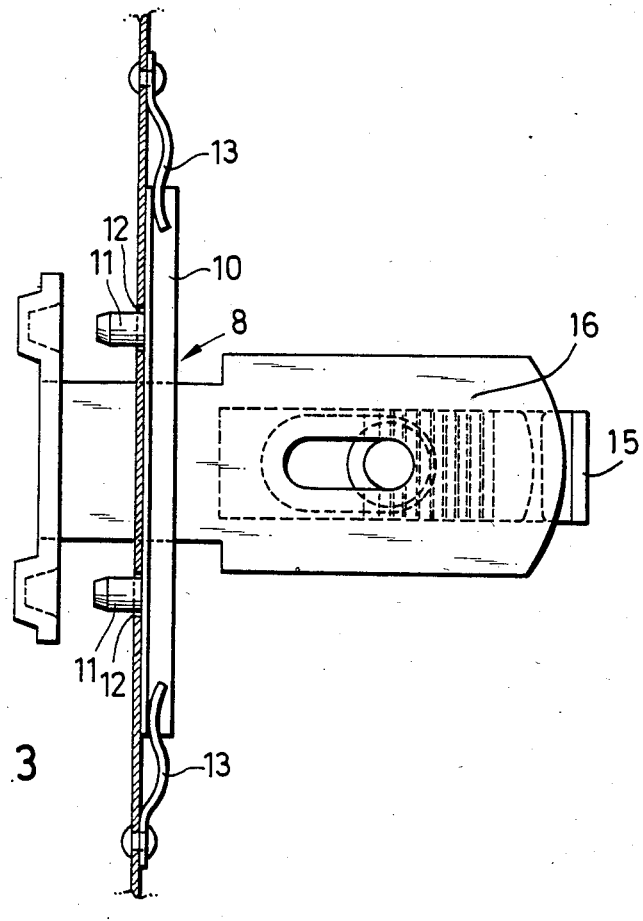
FIG. 3 illustrates a detail showing the operating lever and the pressure plate for compressing the sealing member.

The actuating device 8 comprises pressure plate 10 which is guided by pins 11 in corresponding bores 12 in the end face of the roof opening 2 and is held in its rest position by way of leaf springs 13 (FIG. 3).

The operating lever for acting upon the actuating device 8 comprises a pinion 14, a toothed rack 15 and a connecting lever 16, which are attached to an otherwise conventional manula crank 17 of the sliding roof panel. If the sliding roof panel 1 is moved in conventional manner into its closed position by crank 17, the hydraulic medium 7 within the sealing portion 5 and the reservoir portion 6 is essentially under no pressure. After the sliding roof panel 1 has reached its closed position, the crank handle is swung around in conventional manner into a retracting locking position, and while so doing moves the pinion, toothed rack 15 and connecting lever 16. This movement acts upon the actuating device 8 and displaces it from its rest position into the actuating position shown in broken lines in FIG. 1. In the embodiment of the invention shown, a certain free motion occurs before the reservoir portion 6 is compressed since the large angle of retraction of the crank handle would result in a substantial movement which is unnecessary in this case.

It is evident from the relatively short actuation path of the actuating element 8 which is required, that the sealing arrangement according to the invention may also be applied in connection with doors or tailgates of a motor vehicle, where possibly shorter locking movements may be sufficient, by virtue of suitable matching of the actuating device 8 and the volume of the reservoir portion, to effect the desired reliable sealing action under pressure.

We claim:

1. A sealing arrangement for a joint between an opening in the bodywork of a vehicle and a closure member for the opening, the closure member having an operating lever movable into a locking position after the closure member is closed, the sealing arrangement comprising a sealing member having a generally tubular sealing portion positioned adjacent the opening and a tubular fluid reservoir portion contiguous with the sealing portion along part of the length thereof and in fluid communciation therewith, both portions being filled with a pressure medium, and means operative in response to movement of the operating lever into the locking position after closing of the closure member to compress the reservoir portion and thereby increase the pressure within the tubular sealing portion.

2. A sealing arrangement as defined in claim 1 for a crank-operated sliding roof panel of a motor vehicle, wherein the sealing member is received on a flange of the sliding cover panel to engage the roof opening.

3. A sealing arrangement as defined in claim 2, wherein that the means for compressing the reservoir portion comprises a pressure plate displaceably guided in an end face of the roof opening by way of pins received in corresponding bores.

4. A sealing arrangement as defined in claim 3, wherein the pressure plate is coupled to the crank of the sliding roof panel by means of a connection including a rack and pinion.

* * * * *